(12) United States Patent
Liu et al.

(10) Patent No.: US 11,907,099 B2
(45) Date of Patent: Feb. 20, 2024

(54) PERFORMANCE EVALUATION METHOD USING SIMULATED PROBE DATA MAPPING

(71) Applicant: INTERNATIONAL BUSINESS MACHINES CORPORATION, Armonk, NY (US)

(72) Inventors: Yao Dong Liu, Xi'an (CN); Jing James Xu, Xi'an (CN); Jiang Bo Kang, Xi'an (CN); Dong Hai Yu, Xi'an (CN); Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 16/948,520

(22) Filed: Sep. 22, 2020

(65) Prior Publication Data

US 2022/0091964 A1 Mar. 24, 2022

(51) Int. Cl.
*G06F 11/36* (2006.01)
*G06F 11/34* (2006.01)

(52) U.S. Cl.
CPC ...... *G06F 11/3612* (2013.01); *G06F 11/3688* (2013.01); *G06F 11/3419* (2013.01)

(58) Field of Classification Search
CPC ............. G06F 11/3612; G06F 11/3688; G06F 11/3466; G06F 11/3419; G06F 2201/865
See application file for complete search history.

(56) References Cited

U.S. PATENT DOCUMENTS

| | | | |
|---|---|---|---|
| 6,028,994 A | 2/2000 | Peng | |
| 8,549,522 B1 | 10/2013 | Chatterjee | |
| 9,092,577 B2 | 7/2015 | Chishiro | |
| 9,396,094 B2 * | 7/2016 | Browne | G06F 11/3676 |
| 9,898,393 B2 | 2/2018 | Moorthi | |

(Continued)

FOREIGN PATENT DOCUMENTS

CN 108984405 A 12/2018

OTHER PUBLICATIONS jazz.net, "Test cases and test suites," [accessed on Jan. 14, 2020], 3 pages, Retrieved from the Internet: <URL: https://jazz.net/help-dev/clm/index.jsp?topic=%2Fcom.ibm.rational.test.qm.doc%2Ftopics%2Fc_testcase_overview.html>.

(Continued)

*Primary Examiner* — Michael J Dalbo
(74) *Attorney, Agent, or Firm* — Samuel A. Waldbaum

(57) ABSTRACT

Embodiments of the present invention disclose a method, computer program product, and system for estimating the results of a performance test on an updated software application. A method, the method comprising receiving an updated software application, wherein the size of the updated software application is a first size and generating a plurality of small probe, wherein the size of each of the small probe data is a second size, wherein the second size is less than the first size. Conducting a first performance test on the plurality of small probe data and calculating an estimated elapsed time for a performance test on the updated software application. Conducting the performance test on the updated software application and determining if the updated software is given a PASS or FAIL for the performance test, based in part on the elapsed time of the performance test on the updated software application.

16 Claims, 6 Drawing Sheets

(56) References Cited

U.S. PATENT DOCUMENTS

| | | | |
|---|---|---|---|
| 2012/0054730 A1* | 3/2012 | Michishita | G06F 8/658 |
| | | | 717/169 |
| 2013/0139129 A1* | 5/2013 | Lee | G06F 11/3672 |
| | | | 717/127 |
| 2019/0065336 A1* | 2/2019 | Singhal | G06F 11/302 |
| 2019/0155722 A1* | 5/2019 | Gupta | G06N 20/00 |

OTHER PUBLICATIONS

Mell, et al., "The NIST Definition of Cloud Computing", National Institute of Standards and Technology, Special Publication 800-145, Sep. 2011, 7 pages.

statsoft.com, "How to Analyze Data with Low Quality or Small Samples, Nonparametric Statistics," Nonparametric—Statistics, [accessed on Jan. 13, 2020], 4 pages, Retrieved from the Internet: <http://www.statsoft.com/Textbook/Nonparametric-Statistics>.

* cited by examiner

PERFORMANCE EVALUATION METHOD USING SIMULATED PROBE DATA MAPPING

BACKGROUND

The present invention relates generally to the field of evaluating software, and more particularly to estimating the results for a performance test conducted on software prior to conducting the performance to provide indications if there is a problem with the software when a performance test is conducted.

Performance tests are conducted on software to determine if the software is operating correctly. The elapsed time (i.e. how long it takes to perform the performance test on the software application) of performance tests varies based on the size of the software application. The elapsed time of the performance test increases as the size of the software increases. The software is given a PASS or FAIL only after the performance test has been completed.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for estimating the results of a performance test on an updated software application. A method, the method comprising receiving an updated software application, wherein the size of the updated software application is a first size and generating a plurality of small probe, wherein the size of each of the small probe data is a second size, wherein the second size is less than the first size. Conducting a first performance test on the plurality of small probe data and calculating an estimated elapsed time for a performance test on the updated software application. Conducting the performance test on the updated software application and determining if the updated software is given a PASS or FAIL for the performance test, based in part on the elapsed time of the performance test on the updated software application.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
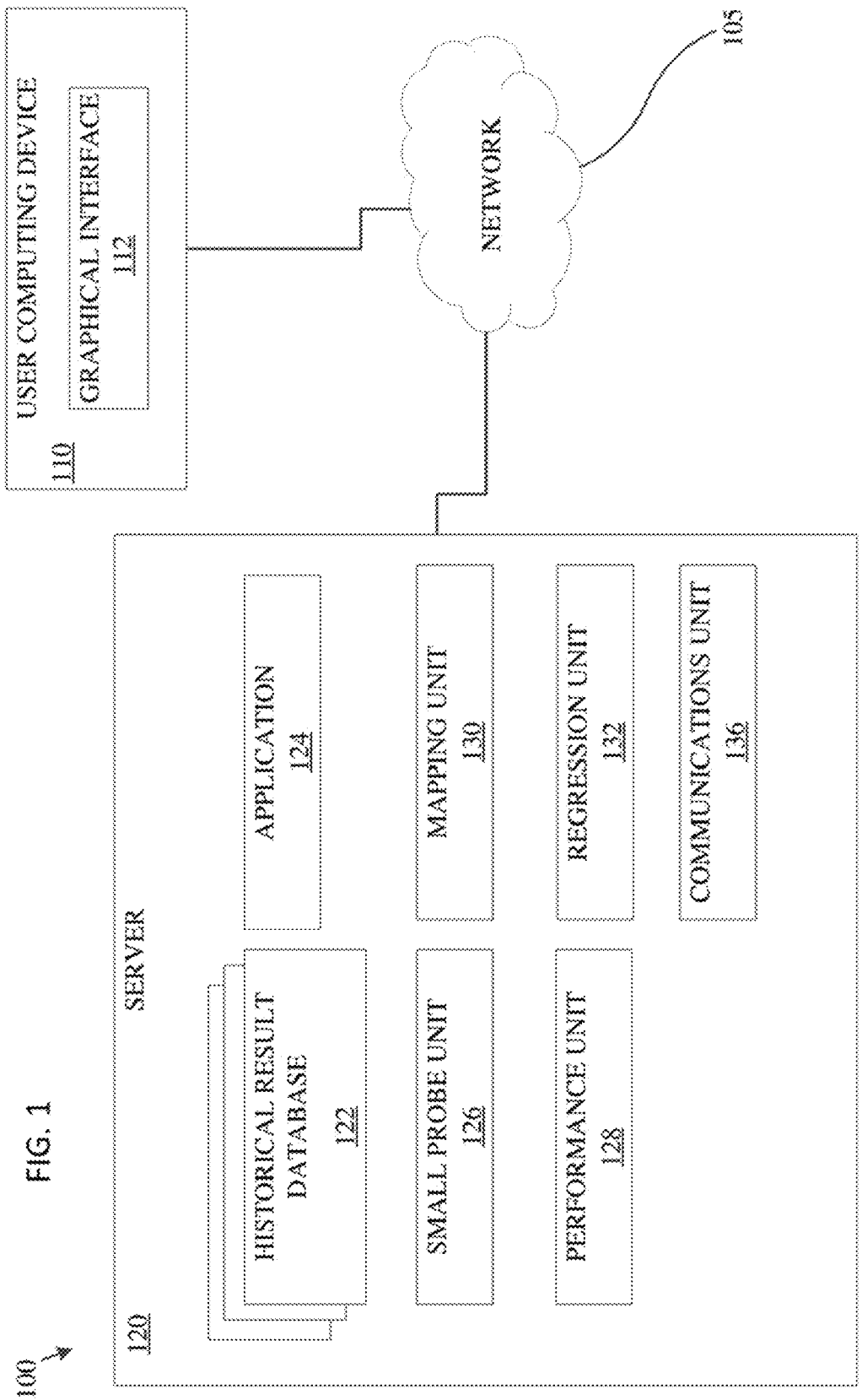
FIG. 1 is a functional block diagram illustrating a software application evaluation processing environment, in accordance with an embodiment of the present invention.
Figure 2:
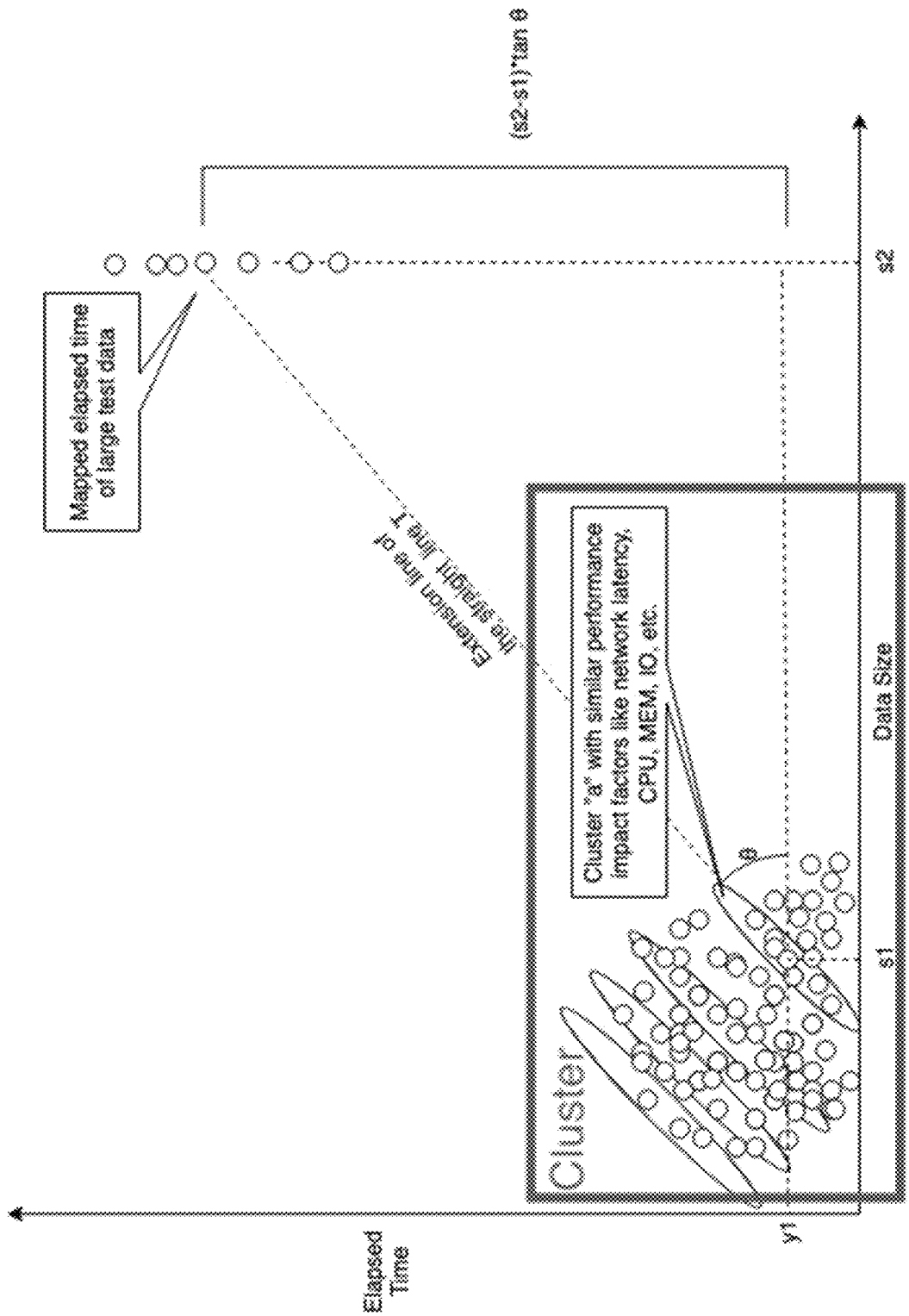
FIG. 2 illustrate a sample of the mapping of the small probe data performance results, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for estimating the results of a performance test to be conducted on a software application. The elapsed time (i.e. how long it takes to perform the performance test on the software application) is estimated for a performance test of a software application and for estimating the computing variables for the performance test.

A software application in development goes through many different updates or versions during the application's development cycle. The updates can add code to the application, remove code from the application, or modify code of the application. The size of the software application typically increases with each update to the application. Problems in the software application can be introduced as the software application is updated.

The system generates a plurality of small probe data, where each of the plurality of small probe data mimics the architecture of the software application. The difference between each of the plurality of small probe data and the software application is that the size (e.g. the amount of data) of each of the small probe data is smaller than the size of the software application. Furthermore, the system varies the values of the computing variables (such as, CPU performance, temperature, network latency, etc.) for the plurality small probe data. Test are conducted on each of the plurality of small probe data and the results are evaluated to provided estimated values prior to conducting the performance test on the software application. So, when the performance test is conducted on the software application, the results of the performance test can be compared to the estimated values to help determine if an error is present in the software application.

Performance tests are conducted on each of the plurality of small probe data and the results of each of the performance tests are mapped using a clustering algorithm. The mapping allows for results of the performance test on each of the plurality of the small probe data to be clustered into groups that have similar computing variables. The mapping allows the estimation of the elapsed time for the performance test for the software application because the elapsed time of the performance test increases linearly with the increase of the size of the application. A regression analysis is applied to the results of the performance test for each of the groups of the small probe data formed during the mapping and the historical performance data for the software application to estimate the different values of the computer conditions for the performance test when it is conducted on the software application. Once the estimates of the performance data are calculated then the performance test is conducted on the software application. A margin of error or a confidence level is set for each estimated value, for example, at 1-10%, so if the results of the performance test on the software application are within the margin of error of the estimated values then the software is given a PASS rating for the performance test. The software can be given a FAIL rating prior to the completion of the performance test, for example, if the elapsed time for the performance test is estimated at 3 hours, but when conducting the performance test on the software application and the elapsed time passes 3½ hours, then the performance test is halted before the test is completed and the software is given a FAIL rating. When the software application is given a FAIL rating for the performance test then the FAIL rating indicates that there are issues with the code of the software application.

FIG. 1 is a functional block diagram illustrating a software application evaluation processing environment 100, in accordance with an embodiment of the present invention.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between server 120 and user computing device 110.

User computing device 110 may be a laptop computer, tablet computer, netbook computer, personal computer (PC), a desktop computer, a personal digital assistant (PDA), a smart phone, or any programmable electronic device capable of communicating with the server 120 via the network 105. User computing device 110 may include internal and external hardware components, as depicted, and described in further detail with respect to FIG. 4. The user computing device 110 has a graphical user interface 112 that allows for the user to add, delete, or modify a software application on the server 120. The graphical user interface 112 allows for the user to interact with the different applications, e.g. performance unit 128, or application 124, stored on the server 120.

Figure 5:
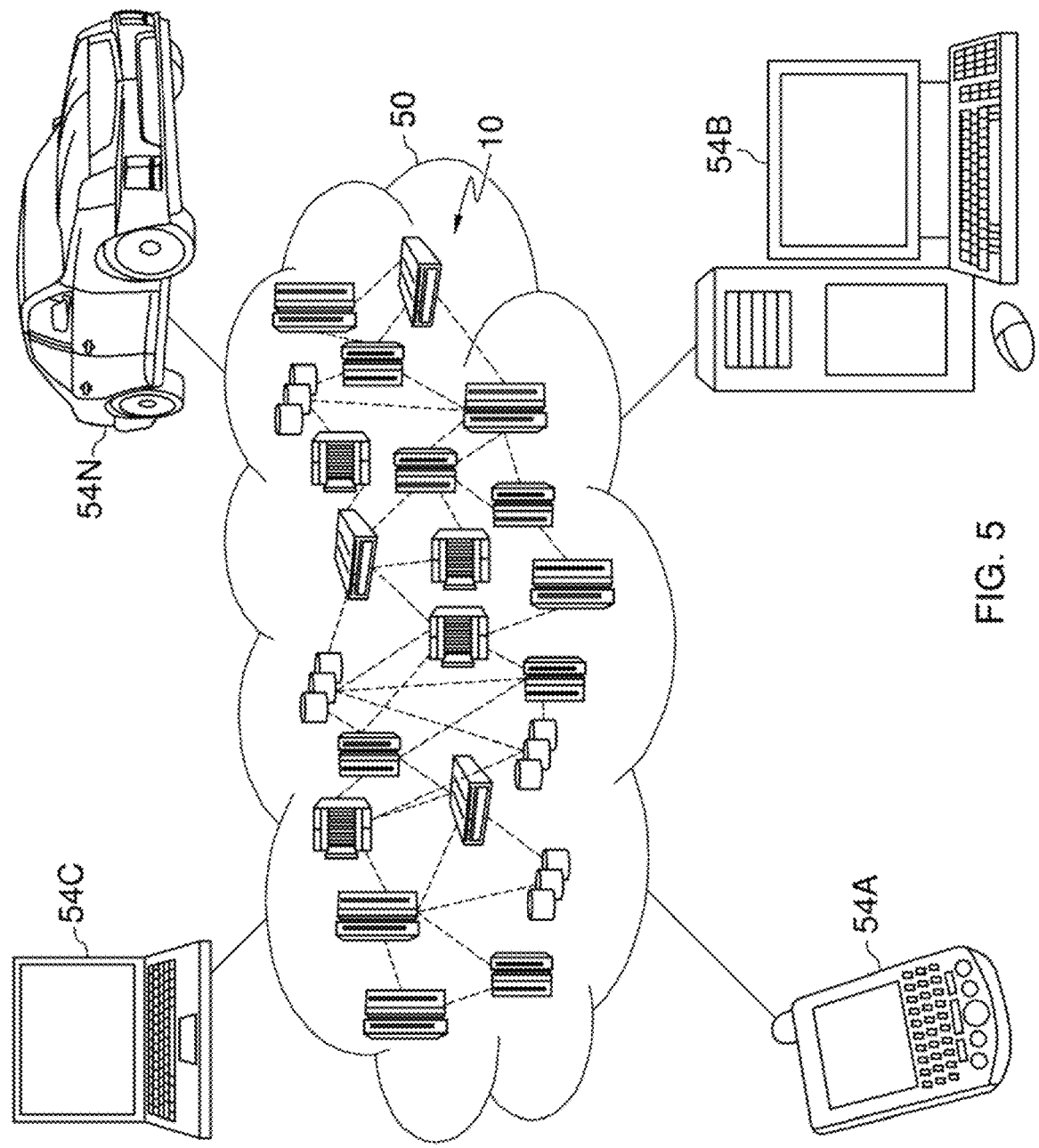
FIG. 5 depicts a cloud computing environment according to an embodiment of the present invention.
Figure 6:
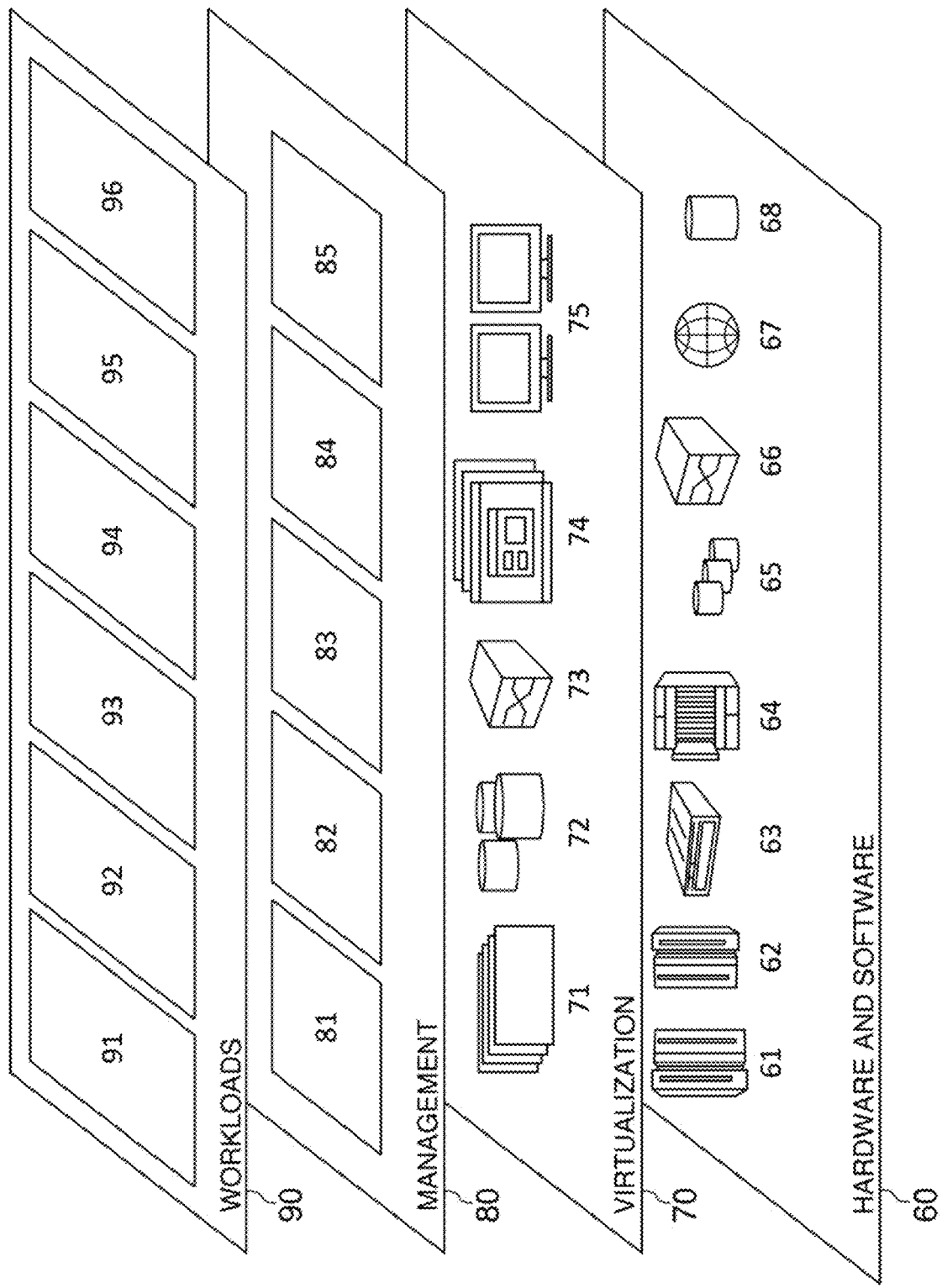
FIG. 6 depicts abstraction model layers according to an embodiment of the present invention.

Server 120 includes historical results database 122, an application 124, small probe unit 126, a performance unit 128, a mapping unit 130, a regression unit 132, and a communications unit 136. Server 120 may be a laptop computer, tablet computer, netbook computer, personal computer (PC), a desktop computer, a personal digital assistant (PDA), a smart phone, server blade, or any programmable electronic device capable of communicating with the user computing device 110, via the network 105. The communications unit 136 allows for the server 120 to receive and send data over the network 105. Server 120 may include internal and external hardware components, as depicted, and described in further detail below with respect to FIG. 4, and operate in a cloud computing environment, as depicted in FIGS. 5 and 6.

Application 124 is a software application that is currently being developed by developers/users. The developers can add code, delete code, or modify code in the application 124 by utilizing the graphical user interface 112 on the user computing device. Application 124 is stored on server 120, which allows for multiple users to interact with the application 124. The historical results database 122 is a data store that stores the results of performance tests that were previously conducted on prior versions of the application 124.

Small probe unit 126 generates a plurality of small probe data to be evaluated by a performance unit 128. Each of the plurality of small probe data have the same structure/architecture as application 124, but the computing variables are varied for each of the plurality of small probe data, for example, at least one of network latency, CPU performance, MEM, and IO, etc. The size (i.e. the amount of data) of each of the plurality of small probe data is smaller than the size (i.e. the amount of data) of the application 124. The elapsed time (i.e. how long it takes to perform the test) of the performance test is shorter when it is conducted on each of the plurality of small probe data then when the performance test is conducted on the application 124.

The performance unit 128 conducts a performance test on each of the plurality of small probe data prior. The performance unit 128 conducts a performance test on the application 124 after the values for the performance test are estimated. The size of the each of the small probe data and the size of the application 124 directly affects how long it takes the performance unit 129 to conducts the performance test. The elapsed time (i.e. how long it takes to conduct the performance test) for the performance test increases linearly with the respect to the size of the data being tested. The performance unit 128 conducts a performance test for each of the plurality of small probe data.

Figure 3:
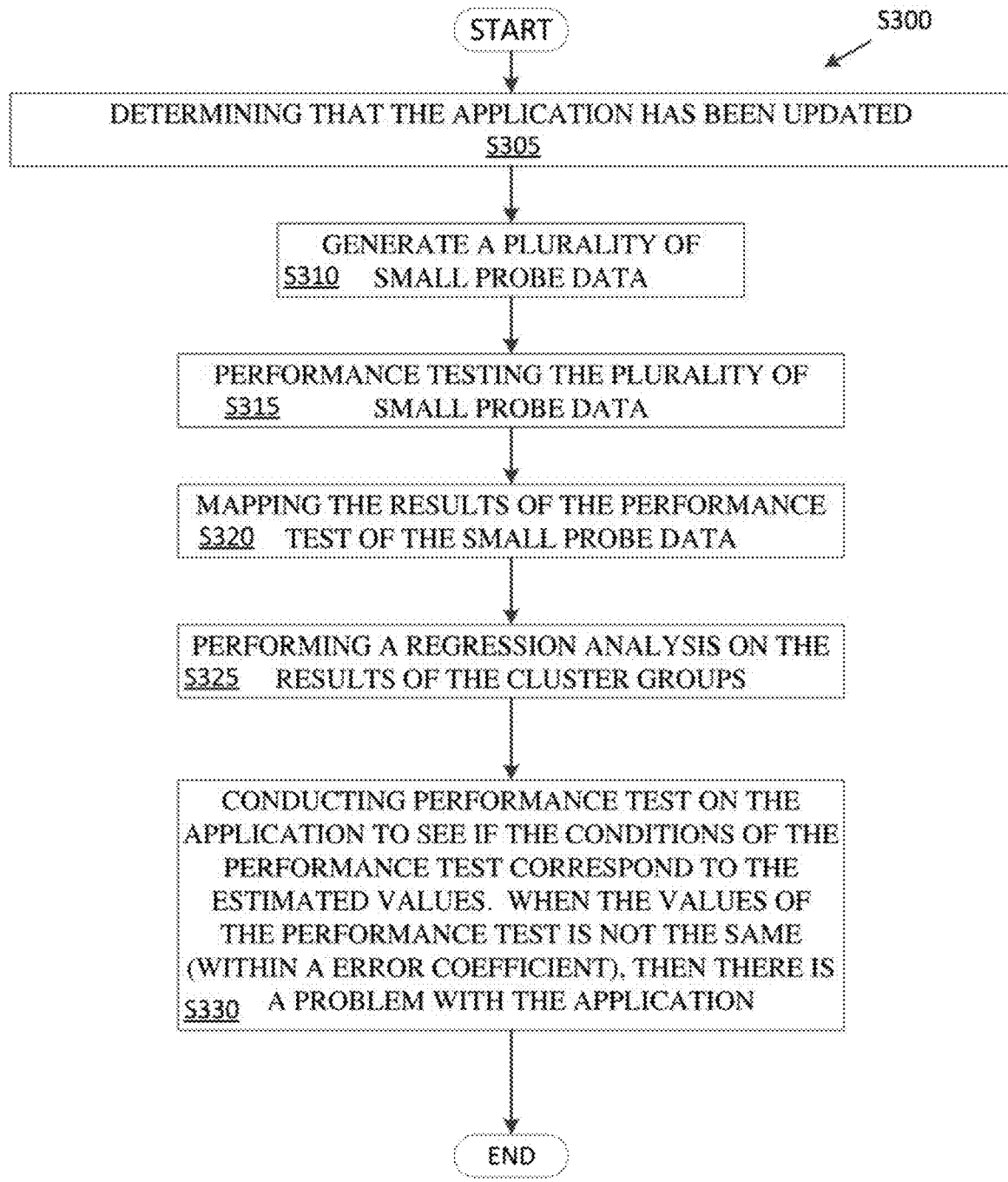
FIG. 3 is a flowchart depicting operational steps of estimating the conditions for the performance test for the software application in the software application evaluation processing environment of FIG. 1, in accordance with an embodiment of the present invention.

The mapping unit 130 applies a clustering algorithm to the results of the performance test conducted on each of the plurality of small probe data. The mapping unit 130 uses a cluster algorithm to form clusters from the results of performance tests on the plurality of small probe data and to map the results. FIG. 3 illustrates an example of the graph the mapping unit 130 produces. Each group (cluster) is composed of multiple results from the performance tests that were conducted on the plurality of small probe data that have similar performance computer variables like CPU, MEM and IO etc., as illustrated by the different circles in FIG. 3. The mapping unit 130 fits a line T to a group (cluster) and extends the line out to the size of the application 124, where the line T has an angle θ with horizontal axis. The mapping unit estimates the elapsed time for the performance test to be conducted on the application 124 by the following equation: Mapped Elapsed Time=(s2−s1)*tan θ+y1, where (s2−s1) means the large data size (the size (s2) of application 124) minus the center data size for the group formed of the results of the performance test (s1), y1 is the elapsed time of center data.

The regression unit 132 retrieves from the historical database 112 the results of performance test conducted on a prior version of application 124 (e.g. historical performance data). The regression unit 132 applies a regression analysis to one group of the data established by the mapping unit 130 and the historical performance data to estimate the different values of the computing variables for the performance test results to be the application 124. The regression unit 132 applies a regression analysis to each group formed by the mapping unit 130 to estimate the values of the computing variables for the performance test results for the application 124 based on each of the determined groups.

Once the elapsed time is estimated by the mapping unit 130 and the computing variables estimated by the regression unit 132, then the performance unit 128 conducts a performance test of the application 124. When the elapsed time of the performance test being conducting on the application 128 exceeds the estimate elapsed time by more than a margin of error (a threshold value) then the performance tested is halted and application 124 is given a FAIL rating. When the elapsed time of the performance test is within the margin of error of the estimate elapsed time, then the performance unit 128 compares the computer variables results from the performance test to the estimated computer variables. When one of the computer variables from the performance test exceed the margin of error (e.g. a threshold value) of the corresponding estimated computer variable, then the application 124 is given a FAIL rating. The performance unit identifies any of the computer variables that could have caused the FAIL rating, (e.g. every computer variable that is outside the margin of error for the corresponding variable) when the performance unit 128 transmits the results of performance test to the user computing device 110.

By having the system estimate the elapse time for the performance test allows for an improvement in the evaluation of application 124. When the estimated elapse is exceeded by the performance unit 128 when conducting the performance test on application 124, then the system is able to identify that application 124 has issues and test can be halted prior to completion, thus providing an improvement in the efficiency of the performance test. By estimating the computing variables for the performance test allows for the system to identify variables that in the results of the performance test on the application 124 that have issues, i.e. exceeding their estimated values. These issues can lead to the application 124 having issues that the developer needs to address, but the system is able to identify which computing variables that are causing the issue.

FIG. 3 is a flowchart depicting operational steps 300 of estimating the conditions for the performance test for the software application in the software application evaluation processing environment of FIG. 1, in accordance with an embodiment of the present invention.

The user updates application 124 on the server 120 by adding, deleting, or modifying the code of the application 124 (S305). The small probe unit 126 generates a plurality of small probe data that has the same architecture as the application 124. However, the size of each of the plurality of small probe data is smaller than the size of the application 124 (S310). The computer variables (e.g. CPU usage, network latency, etc.) are varied over the plurality of small probe data provides a diverse collection of small probe data. The performance unit 128 conducts a performance test on each of the plurality of small probe data (S315). The mapping unit 130 applies a clustering algorithm to the results of the performance test on the plurality of small probe data (S320). The mapping unit 130 forms groups of data from the mapped results. The groups are formed of data that have similar computing variables to each other. The mapping unit 130 estimates the elapsed time for the performance test of the application 124 for each of the formed groups (S320). The regression unit 132 applies a regression analysis to each group of data formed by the mapping unit 130 and the historical performance data of the application 124 to estimate the computing variables results for the performance test on the application (S325). The performance unit 128 conducts a performance test on the application 124 (S330). The elapsed time for the performance test of the application 124 can be less than, equal to, with the margin of error, or greater than the margin of error of the estimated elapsed time. When the elapsed time for the performance test is greater than the margin of error of the estimated elapsed time, then the performance test is halted and the application 124 is given a FAIL rating for the performance test (S330). When the elapsed time for the performance test is less than, equal to, or within the margin of error of the estimated elapsed time, then the performance unit 128 compares the computing variable of the performance test to the estimated performance test. The computing variables for the performance test of the application 124 can be less than, equal to, with the margin of error, or greater than the margin of error when compared to the corresponding estimated computing variables. When at least one of the computing variables for the performance test is greater than the margin of error for the corresponding estimated computing variables, then the performance test for application 124 is given a FAIL rating (S330). When the computing variables for the performance test is equal to or within the margin of error of the estimated computing variables, then the performance unit 128 gives the application 124 a PASS rating.

Figure 4:
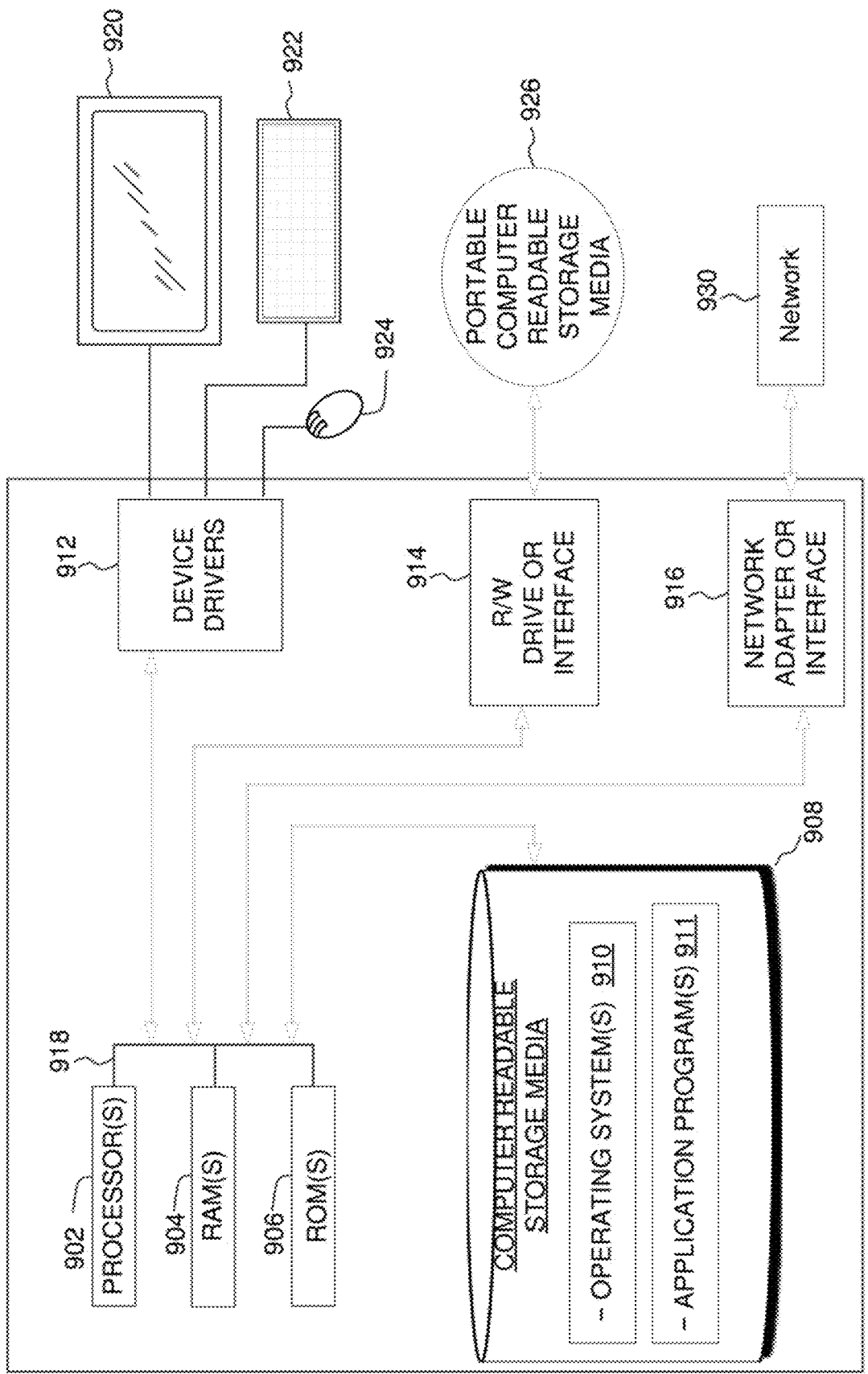
FIG. 4 is a block diagram of components of a computing device of the software application evaluation processing environment of FIG. 1, in accordance with embodiments of the present invention.

FIG. 4 depicts a block diagram of components of server 120 and user computing device 110 of FIG. 1, in accordance with an embodiment of the present invention. It should be appreciated that FIG. 4 provides only an illustration of one implementation and does not imply any limitations regarding the environments in which different embodiments may be implemented. Many modifications to the depicted environment may be made.

Server 120 and user computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, of mapping unit 130 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 120 and user computing device 110 may also include a R/W drive or interface 914 to read from and write to one or more portable computer readable storage media 926. Application programs 911 on server 120 and user computing device 110 may be stored on one or more of the portable computer readable storage media 926, read via the respective R/W drive or interface 914 and loaded into the respective computer readable storage media 908.

Server 120 and user computing device 110 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on server 120 and user computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Server 120 and user computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance unit 96.

Based on the foregoing, a computer system, method, and computer program product have been disclosed. However, numerous modifications and substitutions can be made without deviating from the scope of the present invention.

Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method, the method comprising:
   receiving, by a computer, an updated software application, wherein a size of the updated software application is a first size;
   generating, by the computer, a plurality of small probe data, wherein a size of each of plurality of the small probe data is a second size, wherein the second size is less than the first size;
   conducting, by the computer, a first performance test on the plurality of small probe data;
   calculating, by the computer, an estimated elapsed time for a performance test on the updated software application, wherein calculating the estimated elapsed time comprises utilizing a clustering algorithm to map results of the performance test on plurality of the small probe data;
   conducting, by the computer, the performance test on the updated software application;
   forming, by the computer, groups of the mapped results, wherein the forming the groups of the mapped results are based on computing variables of the mapped results;
   applying, by the computer, the regression analysis on the formed groups of the mapped results and on a historical performance data associated with prior version of the software application to calculate estimate computing variables for the performance test on the updated software application; and
   determining, by the computer, if the updated software is given a PASS or FAIL for the performance test, based in part on the elapsed time of the performance test on the updated software application, and further based on the regression analysis of the performance test.

2. The method of claim 1, wherein when generating the plurality of small probe data, computing variables associated with each of the small probe data is varied.

3. The method of claim 1, wherein a software architecture of each of the plurality of small probe data is a same software architecture as the updated software application.

4. The method of claim 1, wherein the elapsed time for the performance test on the update software application is greater than the estimated elapsed time causing the performance test to be halted.

5. The method of claim 4, wherein the performance test on the updated software application is determined to be given a FAIL since the performance test was halted.

6. The method of claim 1,
wherein the determine, by the computer, if the updated software is given a PASS or FAIL comprises comparing the computing variables for the performance test on the updated software application to the estimated computing variables, wherein the FAIL is given when computing variables exceed the estimated computing variables.

7. A computer program product, the computer program product comprising:
one or more non-transitory computer-readable storage media and program instructions stored on the one or more non-transitory computer-readable storage media, the program instructions comprising:
program instructions to receive an updated software application, wherein a size of the updated software application is a first size;
program instruction to generate a plurality of small probe data, wherein a size of each of the plurality of small probe data is a second size, wherein the second size is less than the first size;
program instructions to conduct a first performance test on the plurality of small probe data;
program instructions to calculate an estimated elapsed time for a performance test on the updated software application, wherein calculating the estimated elapsed time comprises utilizing a clustering algorithm to map results of the performance test on plurality of the small probe data;
program instructions to conduct the performance test on the updated software application;
program instruction to form groups of the mapped results, wherein the forming the groups of the mapped results are based on computing variables of the mapped results;
program instructions to apply the regression analysis on the formed groups of the mapped results and on a historical performance data associated with prior version of the software application to calculate estimate computing variables for the performance test on the updated software application; and
program instructions to determine if the updated software is given a PASS or FAIL for the performance test, based in part on the elapsed time of the performance test on the updated software application, and further based on the regression analysis of the performance test.

8. The computer program product of claim 7, wherein when generating the plurality of small probe data, the computing variables associated with each of the small probe data is varied.

9. The computer program product of claim 7, wherein a software architecture of each of the plurality of small probe data is a same software architecture as the updated software application.

10. The computer program product of claim 7, wherein the elapsed time for the performance test on the update software application is greater than the estimated elapsed time causing the performance test to be halted.

11. The computer program product of claim 10, wherein the performance test on the updated software application is determined to be given a FAIL since the performance test was halted.

12. The computer program product of claim 7,
wherein the determining if the updated software is given a PASS or FAIL comprises comparing the computing variables for the performance test on the updated software application to the estimated computing variables, wherein the FAIL is given when computing variables exceed the estimated computing variables.

13. A computer system, the computer system comprising:
one or more computer processors, one or more non-transitory computer-readable storage media, and program instructions stored on one or more of the computer-readable storage media for execution by at least one of the one or more processors, the program instructions comprising:
program instructions to receive an updated software application, wherein a size of the updated software application is a first size;
program instruction to generate a plurality of small probe data, wherein a size of each of the plurality of small probe data is a second size, wherein the second size is less than the first size;
program instructions to conduct a first performance test on the plurality of small probe data;
program instructions to calculate an estimated elapsed time for a performance test on the updated software application, wherein calculating the estimated elapsed time comprises utilizing a clustering algorithm to map results of the performance test on plurality of the small probe data;
program instructions to conduct the performance test on the updated software application;
program instruction to form groups of the mapped results, wherein the forming the groups of the mapped results are based on computing variables of the mapped results;
program instructions to apply the regression analysis on the formed groups of the mapped results and on a historical performance data associated with prior version of the software application to calculate estimate computing variables for the performance test on the updated software application; and
program instructions to determine if the updated software is given a PASS or FAIL for the performance test, based in part on the elapsed time of the performance test on the updated software application, and further based on the regression analysis of the performance test.

14. The computer system of claim 13, wherein a software architecture of each of the plurality of small probe data is a same software architecture as the updated software application.

15. The computer system of claim 13, wherein the elapsed time for the performance test on the update software application is greater than the estimated elapsed time causing the performance test to be halted.

16. The computer system of claim 15, wherein the performance test on the updated software application is determined to be given a FAIL since the performance test was halted.

* * * * *